US011248977B2

(12) United States Patent
Kuisma (10) Patent No.: US 11,248,977 B2
(45) Date of Patent: Feb. 15, 2022

(54) METHOD AND APPARATUS FOR CANCELLING INTERCONNECTION CAPACITANCE

(71) Applicant: MURATA MANUFACTURING CO., LTD., Nagokakyo (FI)

(72) Inventor: Heikki Kuisma, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 736 days.

(21) Appl. No.: 16/186,966

(22) Filed: Nov. 12, 2018

(65) Prior Publication Data

US 2019/0145843 A1    May 16, 2019

(30) Foreign Application Priority Data

Nov. 13, 2017   (FI) ...................................... 20176012

(51) Int. Cl.
*G01L 9/12*  (2006.01)
*G01L 27/00* (2006.01)
(Continued)

(52) U.S. Cl.
CPC .................. *G01L 9/12* (2013.01); *G01D 5/24* (2013.01); *G01L 9/04* (2013.01); *G01L 27/002* (2013.01);
(Continued)

(58) Field of Classification Search
CPC . G01L 9/12; G01L 9/04; G01L 27/002; G01L 27/005; G01D 5/24; G01N 27/22
See application file for complete search history.

(56) References Cited

U.S. PATENT DOCUMENTS

| 5,321,989 A | * | 6/1994 | Zimmer | ................ G01L 9/0042 29/25.42 |
| 5,431,057 A | * | 7/1995 | Zimmer | ................ G01L 9/0042 29/25.42 |

(Continued)

FOREIGN PATENT DOCUMENTS

| DE | 1004179 A1 | 8/1991 |
| EP | 2988122 A1 | 2/2016 |

(Continued)

OTHER PUBLICATIONS

European Search Report application No. EP 18 20 4798 dated Mar. 7, 2019.
Finnish Search Report dated Jun. 28, 2018 corresponding to Finnish Patent Application No. 20176012.

*Primary Examiner* — Jamel E Williams
(74) *Attorney, Agent, or Firm* — Squire Patton Boggs (US) LLP (57) ABSTRACT

The present invention relates to a method for cancelling effects of changes in interconnection capacitances on capacitive sensor readings, and an apparatus configure to perform such method. The sensor readings are provided by a capacitive sensor connected with an interface circuitry. The interface circuitry has at least two interconnections comprising a sensor interconnection and a compensating interconnection. The method comprises obtaining a total sensor capacitance value from the capacitive sensor, and obtaining a total compensating interconnection capacitance value from the compensating interconnection, calculating a compensated sensor capacitance value by reducing the obtained total compensating interconnection capacitance value multiplied with a weight coefficient from the obtained total sensor capacitance value and providing at an output of the interface circuitry an electrical signal corresponding to the compensated sensor capacitance value. The weight coefficient is (Continued)

independent of changes of relative permittivity in the immediate environment of the capacitive sensor and its interconnections.

16 Claims, 8 Drawing Sheets

(51) Int. Cl.
*G01L 9/04* (2006.01)
*G01D 5/24* (2006.01)
*G01N 27/22* (2006.01)

(52) U.S. Cl.
CPC ............ *G01L 27/005* (2013.01); *G01N 27/22* (2013.01); *G01N 27/228* (2013.01); *G01N 27/223* (2013.01)

(56) References Cited

U.S. PATENT DOCUMENTS

| | | | | |
|---|---|---|---|---|
| 6,564,643 B1* | 5/2003 | Horie | ............ | G01L 9/0073 361/283.4 |
| 2014/0026642 A1* | 1/2014 | O'Connell | ......... | G01N 27/223 73/31.05 |
| 2015/0048848 A1* | 2/2015 | Dawson | ............. | G01L 27/005 324/671 |
| 2017/0030741 A1 | 2/2017 | Lin et al. | | |

FOREIGN PATENT DOCUMENTS

| | | |
|---|---|---|
| GB | 2071852 A | 9/1981 |
| JP | 2009257916 A | 11/2009 |
| JP | 2013024808 A | 2/2013 |
| WO | WO 2014/195878 A1 | 12/2014 |

* cited by examiner

METHOD AND APPARATUS FOR CANCELLING INTERCONNECTION CAPACITANCE

FIELD

The present invention relates to a method related to capacitive sensors. More particularly, the invention relates to a method for canceling interconnection capacitance of a capacitive sensor caused by environmental conditions and an apparatus configured to perform such method.

BACKGROUND

The term capacitive sensor refers to a sensor configured to detect various physical quantities. The measured physical quantity causes a change in a capacitance of the sensor, which can be detected with electronic circuitry and converted for example into digital data. Examples of capacitive sensors are for example capacitive pressure sensors, accelerometers, humidity sensors and chemical sensors.

In capacitive sensor devices an interconnection from a circuitry performing analysis of capacitance values provided by the sensor circuitry often introduces an additional parallel capacitance, which may depend on environmental conditions like temperature and humidity. This interconnection capacitance may cause significant error in the detected capacitance value, and thus error in the detection of the physical quantity measured by the capacitive sensor. Many commonly used dielectric materials are quite unstable with respect to change in environmental conditions. For example, silicone gel that gives excellent protection from fluids in the environment absorbs quite a lot of moisture, which will change the silicone gel's relative permittivity. Relative permittivity of a material is expressed by its dielectric constant. Thus, a change of the relative permittivity is indicated by a change of the dielectric constant. In some materials, like the exemplary silicone gel, the effect of moisture absorbance and the caused change of dielectric constant is quite rapid, varying from minutes to hours. In other materials the change of dielectric constant may be much slower. The change in environmental conditions will change the apparent total sensor capacitance and this change is impossible to distinguish from the change of the physical quantity the sensor is supposed to measure, such as atmospheric pressure or blood pressure.

It is obvious that if the interconnection capacitance could be measured separately it could be subtracted from the total sensor capacitance and the accuracy of the sensor readings could be maintained. Unfortunately, it is not possible to measure the exact value of a particular interconnection disposed inside a structure without disconnecting the sensor from the interconnection and re-connecting it again, which is too tedious in practice and involves possibility to additional changes of the interconnection capacitance.

DESCRIPTION OF THE RELATED ART

In related art the interconnection capacitance is often minimized by special shielding arrangements.

International patent application WO 2014/195878 discloses a shielding method that could be used for shielding also the interconnection wiring tracks on a substrate. In this method, shielding requires multiple conductor and dielectric layers that may not be applicable in assemblies that require very small thickness and very high flexibility.

SUMMARY

An object is to provide a method and an apparatus so as to solve the problem of canceling changes in interconnection capacitance between a capacitive sensor and an interface circuitry due to changes of the relative permittivity without special shield layers. The objects of the present invention are achieved with a method according to the characterizing portion of claim 1. The objects of the present invention are further achieved with an apparatus according to the characterizing portion of claim 11.

The preferred embodiments of the invention are disclosed in the dependent claims.

The present invention is based on the idea of introducing a compensating interconnection that enables fully compensating the amount of change of interconnection capacitance in a sensor interconnection due to changes of relative permittivity in its environment. A compensating interconnection capacitance value is obtained, and a weight coefficient is determined that is used to multiply the compensating interconnection capacitance value before subtracting the multiplied compensating interconnection capacitance value from an obtained total sensor capacitance value in order to receive a compensated sensor capacitance value.

The present invention has the advantage that it enables essentially removing any sensor interconnection capacitance caused error from an output signal of a capacitive sensor. Accuracy of sensing results achieved with the capacitive sensor is thus improved.

According to a first aspect, a method for cancelling effects of changes in interconnection capacitances on capacitive sensor readings provided by a capacitive sensor is provided. The capacitive sensor is connected with an interface circuitry with at least two interconnections comprising a sensor interconnection and a compensating interconnection.

The method comprises obtaining a total sensor capacitance value from the capacitive sensor, obtaining a total compensating interconnection capacitance value from the compensating interconnection, calculating a compensated sensor capacitance value by reducing the obtained total compensating interconnection capacitance value multiplied with a weight coefficient from the obtained total sensor capacitance value, and providing an electrical signal at an output of the interface circuitry that corresponds to the compensated sensor capacitance value. The compensated sensor capacitance value is independent of changes of relative permittivity in the immediate environment of the capacitive sensor, the interface circuitry and the interconnections thereof.

According to a second aspect, the method further comprises connecting the interface circuitry to the compensating interconnection disposed at the immediate vicinity of the sensor interconnection for obtaining the total compensating interconnection capacitance value. The compensating interconnection is electrically connected only to the interface circuitry.

According to a third aspect, the method further comprises obtaining, by the interface circuitry, the total sensor capacitance value when the sensor interconnection is coupled at its first input and a common interconnection is coupled at its second input, and obtaining, by the interface circuitry, the total compensating interconnection capacitance value when the compensating interconnection is coupled at its first input and the common interconnection is coupled at its second input.

According to a fourth aspect, the method further comprises multiplexing the first input of the interface circuitry to be connected to one of the sensor interconnection for obtaining the total sensor interconnection capacitance value, and the compensating interconnection for obtaining the total compensating interconnection capacitance value. The multiplexing occurs at a frequency in a range between 10 milliseconds and 10 minutes.

According to a fifth aspect, the method further comprises obtaining, by the interface circuitry, an integrating base capacitance value when only an integrating base capacitance is coupled at its first input and a common interconnection is coupled at its second input, obtaining, by the interface circuitry, the total sensor capacitance value when the sensor interconnection is coupled at its first input and the common interconnection is coupled at its second input, wherein the total sensor capacitance value includes the integrating base capacitance value, and obtaining, by the interface circuitry, the total compensating interconnection capacitance value when the compensating interconnection is coupled at its first input and the common interconnection is coupled at its second input, wherein the total compensating interconnection capacitance value includes the integrating base capacitance value. The method further comprises subtracting the integrating base capacitance value from both the total sensor interconnection capacitance value and the total compensating interconnection capacitance value before calculating the compensated sensor capacitance.

According to a sixth aspect, the method further comprises multiplexing the first input of the interface circuitry to be connected to one of the sensor interconnection for obtaining the total sensor interconnection capacitance value, the compensating interconnection for obtaining the total compensating interconnection capacitance value, and the integrating base capacitance for obtaining the integrating base capacitance value. The multiplexing occurs at a frequency in a range between 10 milliseconds and 10 minutes.

According to a seventh aspect, the method further comprises disposing the compensating interconnection so that a capacitance between the compensating interconnection and the common interconnection is essentially equal to a capacitance between the sensor interconnection and the common interconnection.

According to an eighth aspect, the method comprises obtaining the weight coefficient by steps of measuring a first total sensor capacitance value and a first total compensating interconnection capacitance value in a first measurement, subjecting the capacitive sensor and its interconnections to a change of relative permittivity in their immediate environment, measuring a second total sensor capacitance value and a second total compensating interconnection capacitance value in a second measurement after subjecting the capacitive sensor and its interconnections to the change of relative permittivity in their immediate environment, calculating a change of the measured total sensor capacitance based on the change between the first and the second total sensor capacitance values, and a change of the measured compensating interconnection capacitance based on the change between the first and the second total compensating interconnection capacitance values; and calculating the weight coefficient by dividing the change of the measured total sensor capacitance by the change of the measured compensating interconnection capacitance.

According to a ninth aspect, the method comprises obtaining the weight coefficient by steps of defining a calibration function, measuring a first total sensor capacitance value, a first total compensating capacitance value and a first reference pressure value, calculating a first compensated sensor capacitance value based on the first total sensor capacitance value and the first total compensating capacitance value using a dummy weight coefficient, calculating, using the calibration function, a first pressure value corresponding to the first compensated sensor capacitance value, subjecting the capacitive sensor and its interconnections to a change of relative permittivity in their immediate environment, measuring a second total sensor capacitance value, a second total compensating capacitance value and a second reference pressure value after subjecting the capacitive sensor and its interconnections to the change of relative permittivity in their immediate environment, calculating a second compensated sensor capacitance value based on the second total sensor capacitance value and the second total compensating capacitance value, calculating, using the calibration function, a second pressure value based on the second compensated sensor capacitance value; and obtaining the weight coefficient by adjusting the weight coefficient used for calculating the first compensated sensor capacitance value, the second compensated sensor capacitance value, the first pressure value and the second pressure value so that a first pressure error calculated using the adjusted weight coefficient equals with a second pressure error calculated using the same adjusted weight coefficient, wherein the first pressure error equals the difference between the first pressure value and the first reference pressure value and the second pressure error equals the difference between the second pressure value and the second reference pressure value.

According to a first device aspect, an apparatus configured to cancel effects of changes in interconnection capacitances on capacitive sensor readings is provided. The apparatus comprises at least the capacitive sensor and an interface circuitry. The capacitive sensor is connected to the interface circuitry with at least two interconnections comprising a sensor interconnection and a compensating interconnection. The apparatus is configured to obtain a total sensor capacitance value from the capacitive sensor, obtain a total compensating interconnection capacitance value from the compensating interconnection, calculate a compensated sensor capacitance value by reducing the obtained total compensating interconnection capacitance value multiplied with a weight coefficient from the obtained total sensor capacitance value, and provide at its output an electrical signal corresponding to the compensated sensor capacitance value. The compensated sensor capacitance value is independent of changes of relative permittivity in the immediate environment of the capacitive sensor, the interface circuitry and the interconnections thereof.

According to a second device aspect the compensating interconnection is disposed at the immediate vicinity of the sensor interconnection. The interface circuitry is configured to be connected to the compensating interconnection for obtaining the total compensating interconnection capacitance value. The compensating interconnection is electrically connected only to the interface circuitry.

According to a third device aspect a common interconnection is coupled at a second input of the interface circuitry. The apparatus further comprises a switch configured to multiplex a first input of the interface circuitry to be connected to one of the sensor interconnection for obtaining the total sensor interconnection capacitance value, and the compensating interconnection for obtaining the total compensating interconnection capacitance value. The multiplexing occurs at a frequency in a range between 10 milliseconds and 10 minutes.

According to a fourth device aspect a common interconnection is coupled at a second input of the interface circuitry. The apparatus further comprises a switch configured to multiplex a first input of the interface circuitry to be connected to one of only an integrating base capacitance for obtaining an integrating base capacitance value, the sensor interconnection for obtaining the total sensor interconnection capacitance value that includes the integrating base capacitance value and the compensating interconnection for obtaining the total compensating interconnection capacitance value that includes the integrating base capacitance value. The multiplexing occurs at a frequency in a range between 10 milliseconds and 10 minutes. The apparatus is further configured to subtract the integrating base capacitance value from both the total sensor interconnection capacitance value and the total compensating interconnection capacitance value before calculating the compensated sensor capacitance.

According to a fifth apparatus aspect, the compensating interconnection is disposed so that a capacitance between the compensating interconnection and the common interconnection is essentially equal to a capacitance between the sensor interconnection and the common interconnection.

According to a sixth apparatus aspect, the apparatus is further configured to measure a first total sensor capacitance value and a first total compensating interconnection capacitance value in a first measurement, to measure a second total sensor capacitance value and a second total compensating interconnection capacitance value in a second measurement after the capacitive sensor and its interconnections have been subjected to a change of relative permittivity in their immediate environment, to calculate a change of the measured total sensor capacitance based on the change between the first and the second total sensor capacitance values, to calculated a change of the measured compensating interconnection capacitance based on the change between the first and the second total compensating interconnection capacitance values, and to calculate the weight coefficient by dividing the change of the measured total sensor capacitance by the change of the measured compensating interconnection capacitance.

According to a seventh apparatus aspect, the apparatus is further configured to define a calibration function, to measure a first total sensor capacitance value, a first total compensating capacitance value and a first reference pressure value, to calculate a first compensated sensor capacitance value based on the first total sensor capacitance value and the first total compensating capacitance value using a dummy weight coefficient, to calculate, using a calibration function, a first pressure value corresponding to the first compensated sensor capacitance value, to measure a second total sensor capacitance value, a second total compensating capacitance value and a second reference pressure value after the capacitive sensor and its interconnections have been subjected to a change of relative permittivity in their immediate environment, to calculate a second compensated sensor capacitance value based on the second total sensor capacitance value and the second total compensating capacitance value and to calculate, using the calibration function, a second pressure value based on the second compensated sensor capacitance value, and to obtain the weight coefficient by adjusting the weight coefficient used for calculating the first compensated sensor capacitance value, the second compensated sensor capacitance value, the first pressure value and the second pressure value so that a first pressure error calculated using the adjusted weight coefficient equals with a second pressure error calculated using the same adjusted weight coefficient, wherein the first pressure error equals the difference between the first pressure value and the first reference pressure value and the second pressure error equals the difference between the second pressure value and the second reference pressure value.

BRIEF DESCRIPTION OF THE DRAWINGS

In the following the invention will be described in greater detail, in connection with preferred embodiments, with reference to the attached drawings, in which.

DETAILED DESCRIPTION

The term circuitry refers to any electronic device capable of receiving, producing or processing electrical signals.

A sensor interconnection couples a sensor to an electronic circuitry. The electronic circuitry may be configured at least to process sensor signals, also known as sensor readings received from the sensor. This invention assumes that there is an additional compensating interconnection that can be interchanged with the sensor interconnection at an electronic circuitry that has a multiplexed input. The compensating interconnection may also be called a dummy interconnection, since it does not actually interconnect any electronic circuitries. The other end of this compensating interconnection is not connected to anything and it should be dimensioned as similar to the sensor interconnection as possible and also disposed into a position as similar to the sensor interconnection as possible. Multiplexing the input allows measuring a capacitance value of the compensating interconnection. This compensating interconnection capacitance can't, however, be subtracted as such from the total detected sensor capacitance value, since in a practical design and implementation taking the production tolerances into account the compensating interconnection can never exactly duplicate the sensor interconnection.

According to this invention it is possible to find a constant weight coefficient for multiplying the compensating interconnection capacitance before subtracting it from the detected total sensor capacitance. The invention is based on using a mold material to fill empty surfaces and spaces near the sensor, circuit and interconnections. The mold material may also be called filling material. The mold material preferably has a dielectric constant $\varepsilon_r$ greater than 1, which is the dielectric constant of air. Molding will change the sensor interconnection capacitance and thus the detected total sensor capacitance $C_{Stot}$ and the detected compensating interconnection capacitance $C_{Ctot}$. If the change of the total detected sensor capacitance is $\Delta C_S$ and the change of the compensating interconnection capacitance is $\Delta C_C$ then the right weight coefficient k to use is $$k = \frac{\Delta C_S}{\Delta C_C} \quad (1)$$

and the compensated sensor capacitance $C_{Scomp}$ is $$C_{Scomp} = C_{Stot} - k C_{Ctot} \quad (2)$$

The compensated sensor capacitance $C_{Scomp}$ thus obtained is essentially free of the influence of the dielectric constant $\varepsilon_r$ of the mold material and, if the interconnections are properly designed, also any other interconnection capacitance components that are not due to the mold material are cancelled. Equivalent alternative and often the easiest way to obtain the right weight coefficient is to calibrate the sensor first using a dummy weight coefficient value k=0 or k=1 or any guessed value for k and select then a new k so that the sensor shows the same pressure error with respect to the prevailing pressure before and after molding.

In the following description, the method for cancelling the interconnection capacitance is proven mathematically.

The total sensor capacitance $C_{Stot}$ can be defined as a combination of three components: the sensor capacitance $C_S$, the interconnection capacitance due to the mold cavity $C_{SM}$ and interconnection capacitance due to other materials $C_{SO}$. Correspondingly, the compensating interconnection capacitance $C_{Ctot}$ may be defined as a combination of two components: the interconnection capacitance due to the mold cavity $C_{CM}$ and due to other materials $C_{CO}$.

$$C_{Stot} = C_S + C_{SO} + \varepsilon_r C_{SM} \quad (3)$$

$$C_{Ctot} = C_{CO} + \varepsilon_r C_{CM} \quad (4)$$

where $\varepsilon_r$ is the dielectric constant of the material in the mold cavity. Before molding the dielectric constant of the air in the mold cavity $\varepsilon_r = 1$ and after molding the dielectric constant $\varepsilon_r$ has a value of the molding material. For example, the dielectric constant may be approximately 2.5 for some silicone materials. The changes of the sensor capacitance $C_s$ and in the interconnection capacitance $C_C$ due to molding are $$\Delta C_S = (\varepsilon_r - 1) C_{SM} \quad (5)$$

$$\Delta C_C = (\varepsilon_r - 1) C_{CM} \quad (6)$$

Combining equations (5) and (6) gives the physical meaning of the weight coefficient k of equation (1):

$$k = \frac{C_{SM}}{C_{CM}} \quad (7)$$

The equation for the compensated sensor capacitance (2) now becomes $$C_{Scomp} = C_S + C_{SO}\left(1 - \frac{C_{CO} C_{SM}}{C_{CM} C_{SO}}\right) \quad (8)$$

which is totally independent of the dielectric constant $\varepsilon_r$ of the mold material.

If the compensating interconnection is designed very similar to the sensor interconnection, then $$\frac{C_{CO}}{C_{CM}} \approx \frac{C_{SO}}{C_{SM}} \quad (9)$$

and for the compensated sensor capacitance we get from equation (8)

$$C_{Scomp} = C_S \quad (10)$$

which means perfect cancelling of the sensor interconnection capacitance. Reference to designing the compensating interconnection very similar to the sensor interconnection means that area and distance of the compensating interconnection may differ somewhat from those of the sensor interconnection, but the proportions of the interconnections are retained alike. The key target of maintaining the proportions of the interconnections alike is that the capacitance between the sensor interconnection to a reference interconnection and capacitance between the compensating interconnection to the same reference interconnection are essentially equal. With essentially equal capacitances we mean that the capacitances are designed to be as equal as practically possible.

Figure 1:
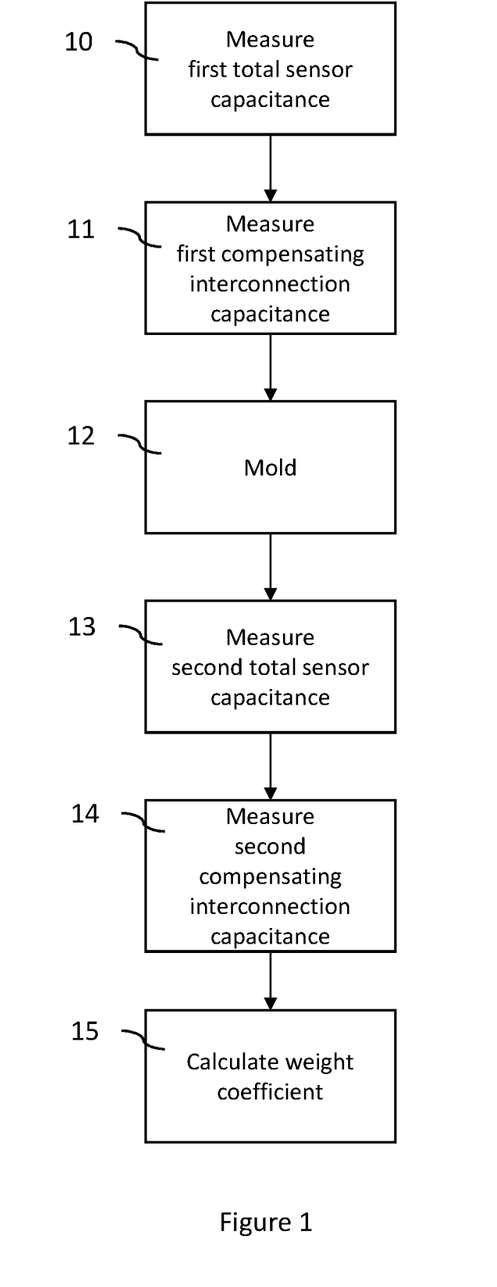
FIG. 1 illustrates a flow chart of a first process for defining a weight coefficient.

FIG. 1 illustrates a flow chart of a first exemplary process for defining the weight coefficient k. In the phase 10, the total sensor capacitance is measured, and in the phase 11 the total compensating interconnection capacitance is measured. As understood by a skilled person, phases 10 and 11 may be performed in any order without departing from the scope. After obtaining the initial values of the total sensor interconnection capacitance and the total compensating interconnection capacitance, the interconnections are covered in the phase 12 with a mold having a dielectric constant $\varepsilon_r$ higher than that of the air. The molding causes subjecting the sensor and its interconnections to a change of the relative permittivity and thus also a change of the dielectric constant in their immediate environment. As known in the art, change of the relative permittivity of material between plates of a capacitor causes a change of capacitance.

After applying the mold material in the phase 12, the total sensor capacitance is measured again in the phase 14 and the total compensating interconnection capacitance is measures again in the phase 15. Similar to phases 10 and 11, phases 14 and 15 may be performed in any order without departing from the scope. The environmental conditions relevant to the sensor, e.g. the atmospheric pressure for a pressure sensor must be maintained the same during both the initial measurement before molding and the measurement after molding. Alternatively, the environmental conditions, e.g. pressure, must be recorded and the sensor calibration must be used to normalize the sensor capacitance to the initial value. Finally, in the phase 16, the weight coefficient k is calculated based on the measurement results obtained in phases 10, 11, 14 and 15.

Figure 2:
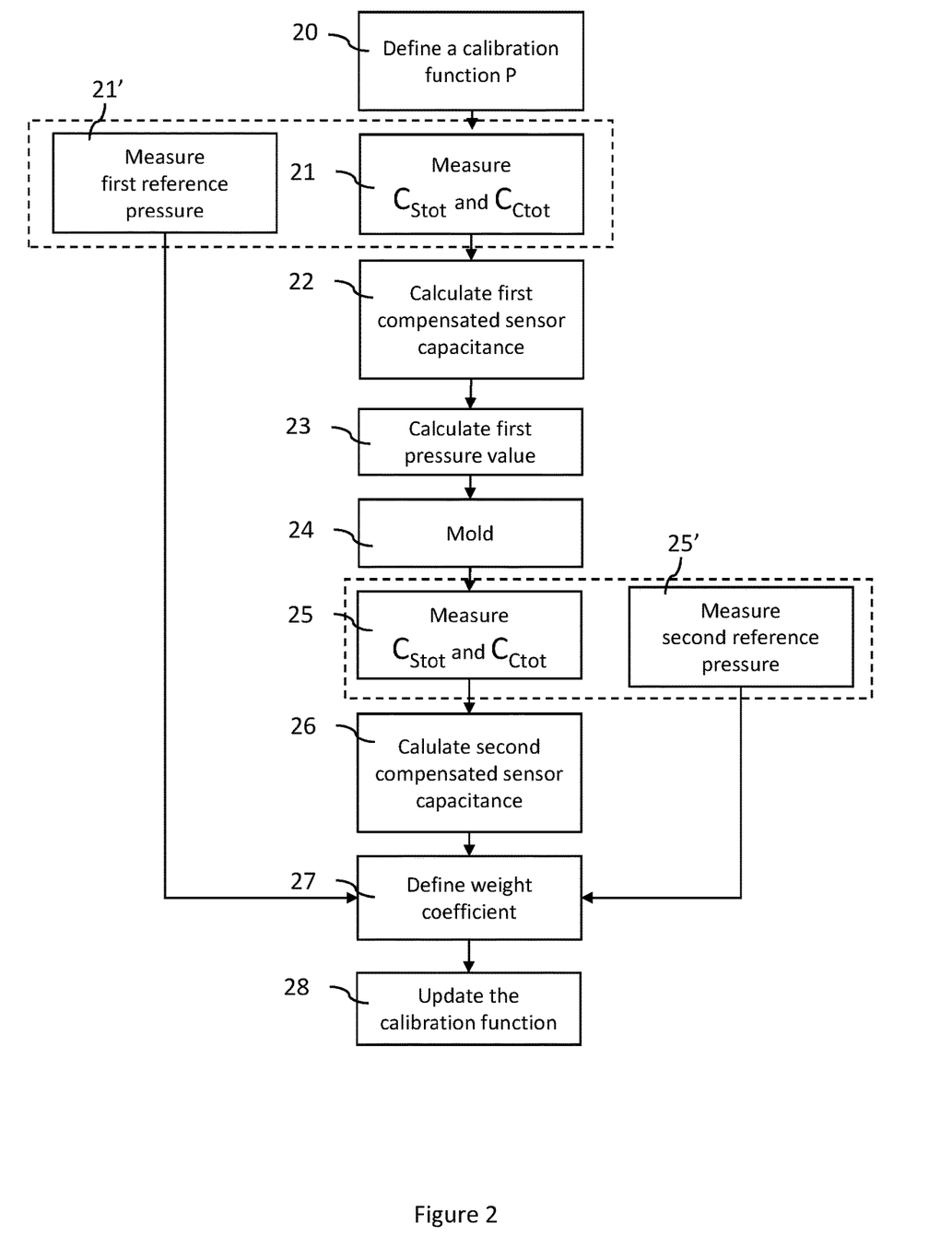
FIG. 2 illustrates a flow chart of a second process for defining a weight coefficient.

FIG. 2 illustrates a flow chart of a second exemplary process for defining the weight coefficient k. In the second process, the mathematical basis for defining the weight coefficient k is the same as in the first exemplary process, but this method allows change in the ambient pressure during the definition process and is thus more feasible to be used in a manufacturing and calibration process of a commercial product.

A calibration function P is defined for calibrating the pressure sensor in the phase 20. In order to define the calibration function, the total sensor capacitance and the total interconnection capacitance are measured at a number of pressure points and the capacitance and pressure values are recorded. The pressure values at the number of pressure points may be recorded with a second, calibrated pressure sensor. A mathematical calibration function P is defined for calculating the output pressure value from the compensated sensor capacitance value. The calibration function P is a function that gives the smallest average pressure error over the desired pressure range. The function may be a polynomial of capacitance values or inverse capacitance values or it may be a hyperbolic function of the capacitance value (i.e. a sum of a constant and an inverse of a polynomial of capacitance values) or it may be based on a look-up table with interpolated values between the tabulated values. The numerical constants in this function or the tabulated values are called calibration coefficients. The calibration function P is a function of the compensated sensor capacitance $C_{Scomp}$ and the weight coefficient k, and the result of the calibration function P is a pressure value p. A dummy weight coefficient $k_0$ is used in the calibration phase 20. For example, the dummy weight coefficient $k_0$ may be given a value $k_0=0$, $k_0=1$ or any other value e.g. based on experience on prior, nominally similar devices. The calibration function may be performed by any known type of processing device, for example a computer, a processor, a microprocessor, an application specific integrated circuit (ASIC) and so on.

In the phase 21, the total sensor capacitance $C_{Stot}$ and the total compensating interconnection capacitance $C_{Ctot}$ are measured. Preferably, the total sensor capacitance value is measured simultaneously with the measurement of a first reference pressure value with the reference pressure sensor in the phase 21' illustrated by the dashed box in the flow chart.

Based on the obtained capacitance values in the phase 21, a first compensated sensor capacitance $C_{Scomp1}$ is calculated in the phase 22 using the equation (2) with the dummy weight coefficient $k_0$ used during the calibration phase 20.

A first detected pressure value p is calculated in the phase 23 with the calibration function P using the first compensated sensor capacitance $C_{Scomp1}$ and the dummy weight coefficient $k_0$. The first pressure value p after the first measurement may thus be expressed by the equation $$p=P(C_{Scomp1},k_0) \quad (11)$$

If the calibration coefficients were selected optimally in the calibration phase 20 then equation (12) for a first pressure error $P_{err1}$ is at least approximately true:

$$P_{err1}=P(C_{Scomp1},k_0)-p1\approx 0 \quad (12)$$

Although not shown in the FIG. 2, the first pressure error may be calculated at any phase after obtaining the first pressure value and the first reference pressure value for example for verifying the calibration function. The pressure and capacitance measurements of the phases 21 and 21' occur preferably essentially simultaneously, and the reference pressure sensor should be located near the sensor under calibration so that the ambient pressure is essentially the same for the both sensors. The first pressure error $P_{err1}$ may also be calculated only during the phase 29.

The sensor is then molded in the phase 24, covering the sensor with the protective filling, and thus subjecting the sensor and its interconnections to a change of relative permittivity and the dielectric constant in their immediate environment. After the molding in the phase 24, the total sensor capacitance $C_{Stot}$ and the total compensating capacitance $C_{Ctot}$ are measured again in the phase 25, and a second compensated sensor capacitance $C_{Scomp2}$ is calculated in the phase 26 using the equation (2).

The ambient pressure may have changed to p2, since some time has passed since the first pressure measurement used for the calibration, and also because it may not be economically feasible to standardize the ambient pressure. The ambient pressure p2 is measured with the reference pressure sensor in the phase 25' preferably essentially simultaneously to measuring the total sensor capacitance and the total compensating capacitance in the phase 25 as illustrated with the dashed box in the flow chart. Preferably, the total sensor capacitance value is measured simultaneously with the measurement of the reference pressure value with the reference pressure sensor. Although not shown in the FIG. 2, the first pressure error may be calculated at any phase after obtaining the second pressure value and the second reference pressure value for example for verifying the calibration function.

The dielectric constant of the filling material has now altered the total sensor capacitance and using the dummy weight coefficient $k_0$ perfect compensation of the capacitance will not occur. A second pressure error calculated with equation (12) would therefore now be non-zero:

$$P_{err2}=P(C_{Scomp2},k_0)-p2\neq 0 \quad (12')$$

In order to cancel the effect of the mold material it is desired to equalize the pressure errors before and after filling with the mold material. An adjusted weight coefficient k may now be defined in the phase 27 using the calibration function P, so that that the pressure readings provided by the pressure sensor fulfill the condition for the pressure measurement error:

$$P_{err1}=P(C_{Scomp1},k)-p1=P_{err2}=P(C_{Scomp2},k)-p2\neq 0 \quad (13)$$

In other words, the weight coefficient k is adjusted so that the newly calculated first pressure error $P_{err1}$ equals with the second pressure error $P_{err2}$ both being calculated with the adjusted weight coefficient k.

Using the adjusted coefficient k, the equation (12) holds no more and the non-zero pressure error $P_{err1}=P_{err2}$ of equation (13) may become significant. But it is more important to ensure that the change in the compensated sensor capacitance due to the dielectric constant of the added mold material is zero. This target can be achieved by defining the correct value of the weight coefficient k used in the calibration function P for calculating the compensated sensor capacitance.

In the optional phase 28 the calibration function may be further updated using the original recorded calibration data points from phase 20 with the adjusted weight coefficient k defined in the phase 27. The updated calibration function $P_{upd}$ is a function that gives the smallest average pressure error over the desired pressure range when using the adjusted weight coefficient k. Correctness of the updated calibration function $P_{upd}$ may be checked by the required condition $$P_{upd}(C_{Scomp1},k)-p1=P_{upd}(C_{Scomp2},k)-p2\approx 0 \quad (14)$$

In other words, if the updated calibration function $P_{upd}$ is defined correctly, the difference between the first and the second obtained pressure values calculated from the first and second compensated sensor capacitances using the updated calibration function $P_{upd}$ and the weight coefficient k, and the respective first and second ambient pressures p1 and p2, becomes approximately zero. The updated calibration function $P_{upd}$ now includes both the information on the correct adjusted weight coefficient k and any other calibration parameters needed to obtain accurate pressure value readings. The updated calibration function $P_{upd}$ and the adjusted weight coefficient k may be applied to obtain a compensated and calibrated pressure value based on a total sensor capacitance value and a total interconnection capacitance value received from the pressure sensor and the dummy interconnection.

Figure 3:
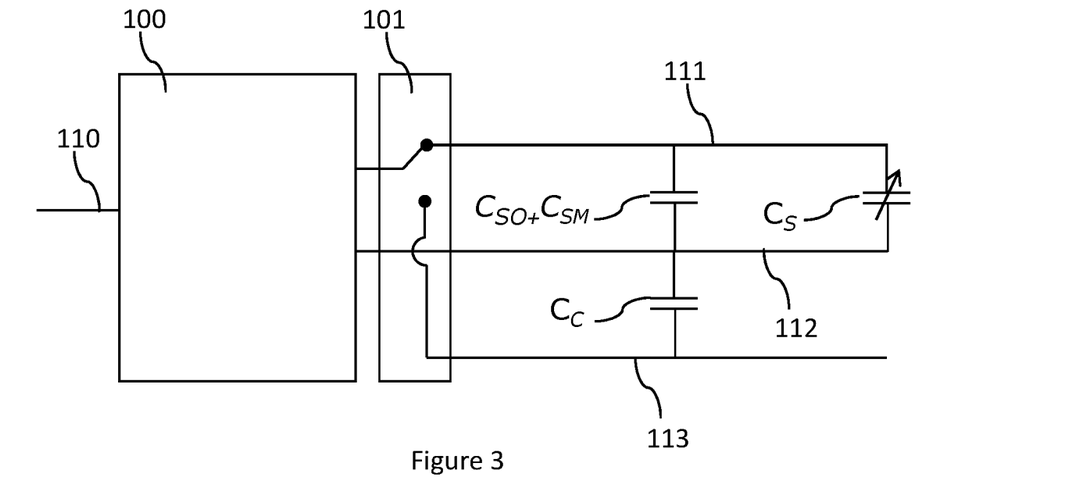
FIG. 3 illustrates a schematic of a circuitry.

FIG. 3 illustrates a general schematic of a circuitry used for implementation of the above described compensating method. An interface circuitry 100 comprises at least capacitance conversion unit configured to convert the capacitance value of a capacitor connected to it into an analog or digital output signal 110. The output signal 110 may be characterized as an electrical signal representing a value of a physical quantity. In case of a capacitive sensor, the output signal may be an analog or digital signal corresponding to or representing an obtained capacitance value. A switching unit 101 enables to connect either the total sensor capacitance $C_{Stot}$ or the total compensating interconnection capacitance $C_{Ctot}$ to the input of the capacitance conversion unit. Multiplexing, in other words switching between the two capacitances, should be done often enough depending on the speed of the changes of the dielectric constant in their environment. In some cases, the frequency maybe once in ten minutes and in other cases every millisecond.

There are three types of interconnections in this arrangement. A sensor interconnection 111 is coupled to one multiplexed input of the switching unit 101, and it connects the sensor to capacitance conversion unit of the interface circuitry 100 via the switching unit 101. A compensating interconnection 113 is coupled to the other multiplexed input of the switching unit 101. A common interconnection 112 is preferably directly coupled to an input of the capacitance conversion unit of the interface circuitry 100.

Instead of the circuitry of the FIG. 3, any other circuitry may be used to implement the functionalities of the FIGS. 1 and 2.

Figure 4:
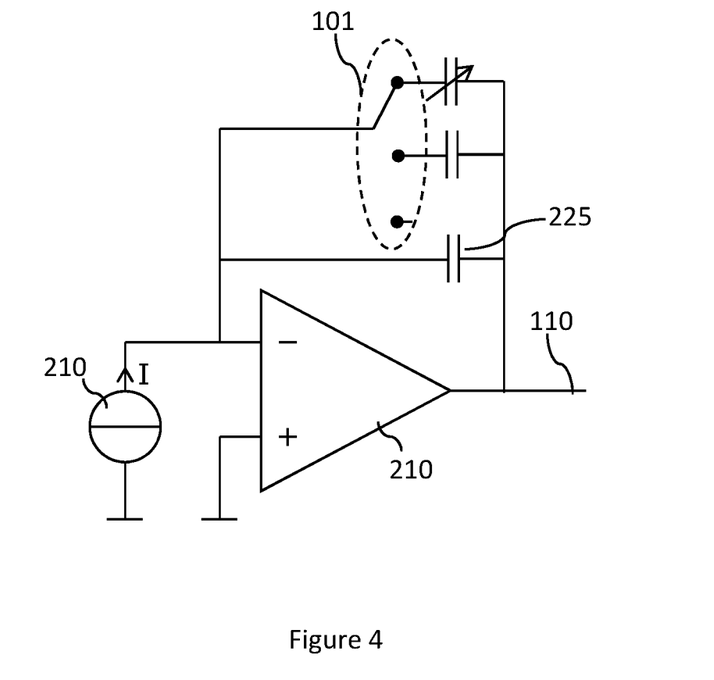
FIG. 4 illustrates a schematic of an exemplary implementation of a circuitry.

FIG. 4 illustrates a schematic of an exemplary implementation of a circuitry comprising a combined conversion unit and a switching unit. This implementation comprises of an integrating converter where a constant current I is fed from a current source 210 to the inverting input of an amplifier 220 and an integrating base capacitance is provided between the inverting input (−) and output of the amplifier 220. In the circuitry of the FIG. 4, the output voltage provided at the output 110 will rise with a constant slope that is proportional to the integrating base capacitance. This slope may be measured with two threshold voltage level detectors and a pulse counter (not shown). The integrating base capacitance is a sum of a base capacitance 225 and either the total sensor capacitance $C_{Stot}$ or the total compensating interconnection capacitance $C_{Ctot}$, depending on the position of the switch 101. The base capacitance 225 is needed since the value of the total compensating interconnection capacitance $C_{Ctot}$ may be very small and the slope of the output voltage may be very steep which may lead to an impractically short time period between two output voltage threshold levels. The known value of the base capacitance 225 is be subtracted from the total sensor capacitance $C_{Stot}$ and the total compensating interconnection capacitance $C_{Ctot}$ before applying equation (2). This is easily implemented by having a third position of the switch 101 with which only the base capacitance 225 switched to the converter.

Figure 5:
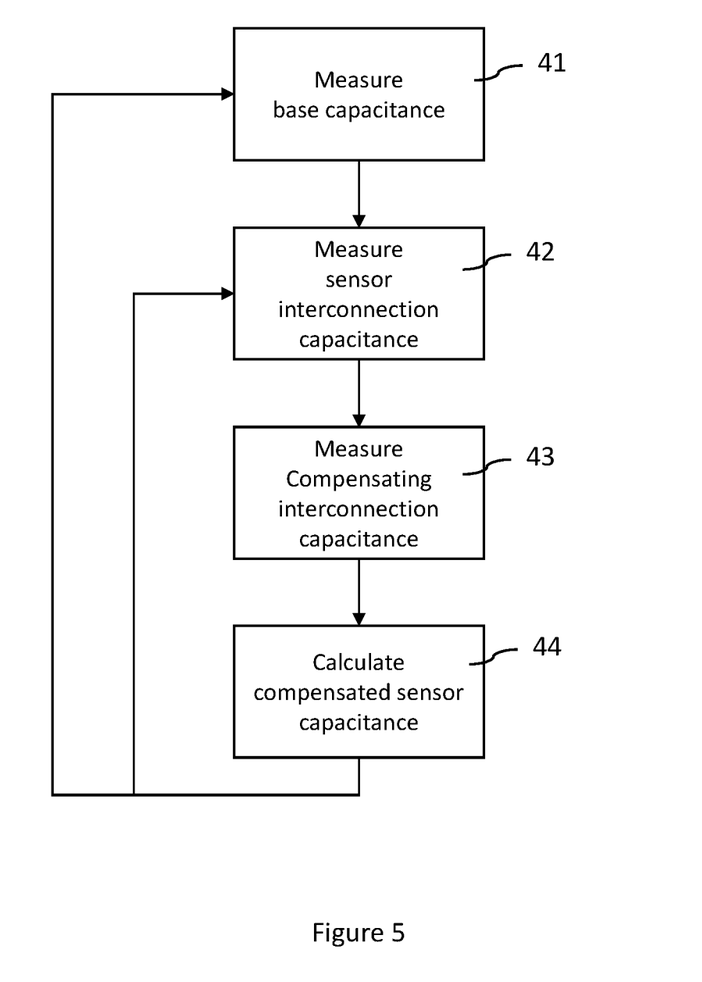
FIG. 5 illustrates a flow chart of the process for calculating the compensated sensor capacitance.

FIG. 5 illustrates a flow chart of the process for calculating a compensated sensor capacitance.

In the phase 41, the switching circuit is changed to couple with the interconnection towards the base capacitance, and the base capacitance is measured. This phase is needed only if a base capacitance is used as illustrated in the FIG. 4. If there is no base capacitance to be measured, the phase 41 may be omitted. In the phase 42, the switching circuit is changed to couple with the sensor interconnection, and the total sensor capacitance is measured. In the phase 43, the switching circuit is changed to couple with the compensating interconnection, and the total compensating interconnection capacitance is measured. If a base capacitance was measured in the phase 41, the base capacitance value is first subtracted from both the total sensor interconnection capacitance value and the total compensating interconnection capacitance value, and then the compensated sensor capacitance is calculated using the equation (2) in the calculation phase 44. If no base capacitance was measured, the compensated sensor capacitance may be calculated directly based in the measured total sensor capacitance and the total compensating interconnection capacitance. The steps 42, 43 and 44 may be repeated as a first continuous loop. When the base capacitance is available, the measurement may be calibrated regularly by choosing the loop through phases 41, 42, 43 and 44 instead. As understood by a skilled person, phases 42 and 43 may be switched without departing from the scope.

Figure 6:
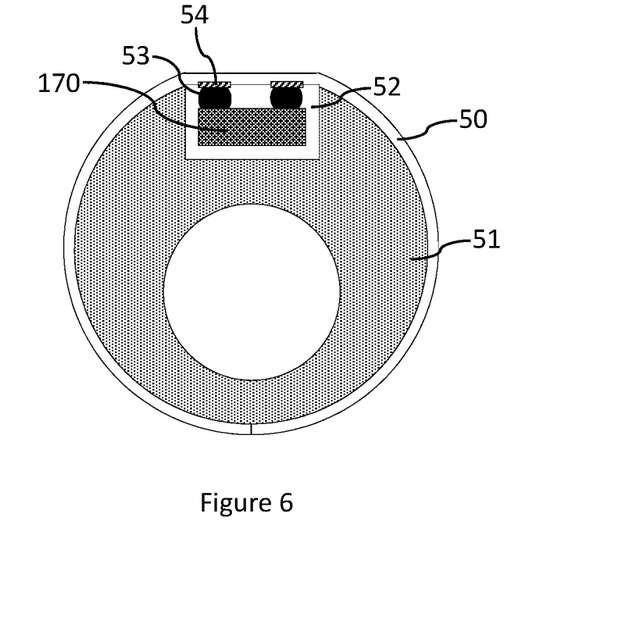
FIG. 6 illustrates a first cross-section of the medical catheter device.
Figure 7:
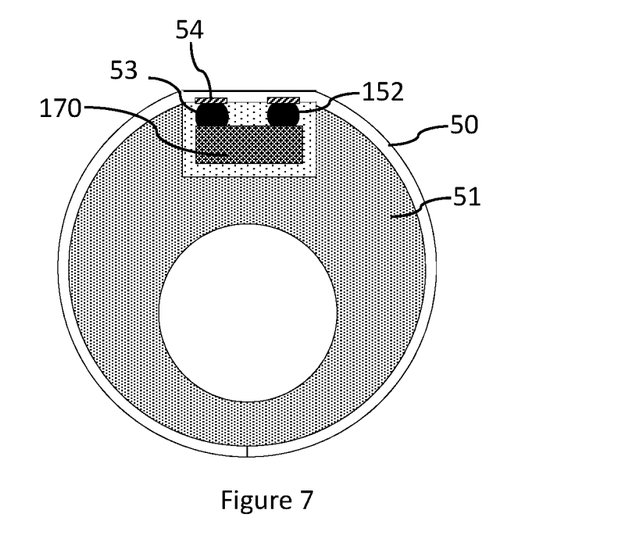
FIG. 7 illustrates a second cross-section of the medical catheter device.

FIGS. 5, 6 and 7 illustrate a first exemplary embodiment of the invention. This embodiment discloses a structure of a medical catheter device where the interface circuitry 100 and the capacitive sensor 70 are implemented by semiconductor chips which are flip-chipped on a flexible circuit board 50. As known by a person skilled in the art, the term flip-chipped refers a semiconductor mounting technology in which a bare semiconductor chip with solder bumps or other equivalent protruding members disposed on chip pads of the semiconductor chip may be directly coupled to an external circuit by reflow soldering, conductive adhesive or equivalent.

FIGS. 5 and 6 illustrate a cross-section of the medical catheter device. This cross-section may equally represent either the installation of the capacitive sensor chip 70 or the interface circuitry 100. Both the flip-chipped interface circuitry 100 and the flip-chipped capacitive sensor 170 are coupled by the solder bumps 53 with wiring 54 exposed on the face of the flexible circuit board 50. The flexible circuit board 50 is wrapped around a medical catheter body 51 so that both the interface circuitry 100 and the capacitive sensor 170 are disposed in a recess 52 manufactured within the side wall of the hollow catheter body 51.

For defining of the calibration coefficient k, the initially air-filled installation recess 52 shown in the FIG. 6 is filled with mold material 152 as illustrated in the FIG. 7. The mold material 152 may be for example silicone gel. The installation recess 52 represents the immediate environment of the circuitry and the interconnections thereof.

Figure 8:
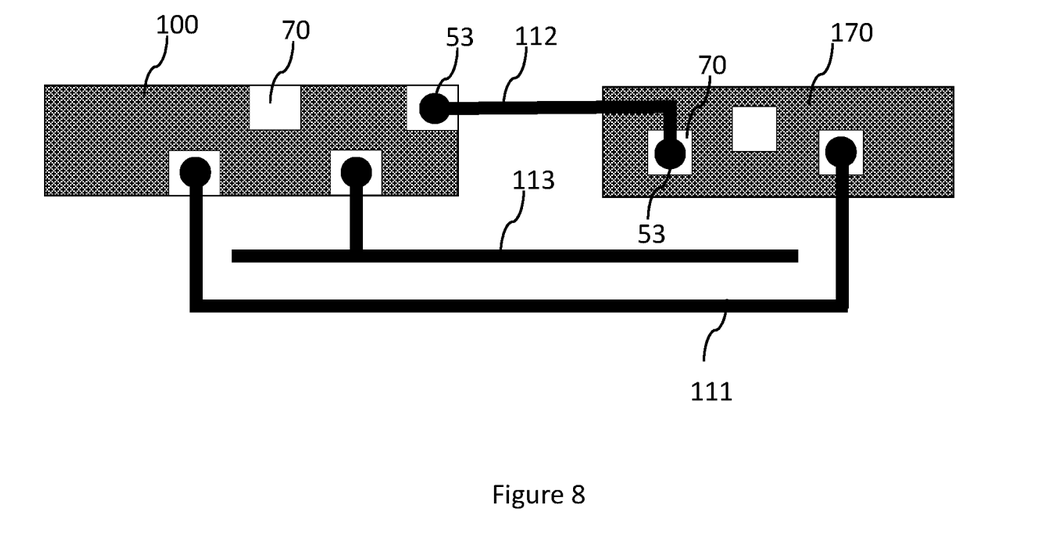
FIG. 8 illustrates interconnections between adjacent ends of a sensor chip and an interface circuitry chip according to a first embodiment.

FIG. 8 illustrates interconnections between adjacent ends of the sensor chip 170 and the interface circuitry chip 100. The chip pads 70 are coupled with wiring on the flexible circuit board by the solder bumps 53. Interconnection tracks 111, 112 are disposed on the flexible circuit board 50 that electrically connect the sensor 170 and the interface circuitry 100 with each other. The compensating interconnection track 113 is only connected to an input of the interface circuitry 100 and it follows the sensor interconnection track 111 disposed between the sensor 170 and the interconnection circuitry 100 as closely as possible in the immediate vicinity of the sensor interconnection track 111. The aim of the placement of the tracks is to have an equal capacitance from both the sensor interconnection track 111 and the compensating interconnection track 113 to the common interconnection track 112. The equal capacitances facilitate obtaining an accurate weight coefficient k.

FIGS. 9, 10, 11 and 12 illustrate a second exemplary embodiment of the invention. The second embodiment is particularly useful for verifying the validity of the compensation method.

Figure 9:
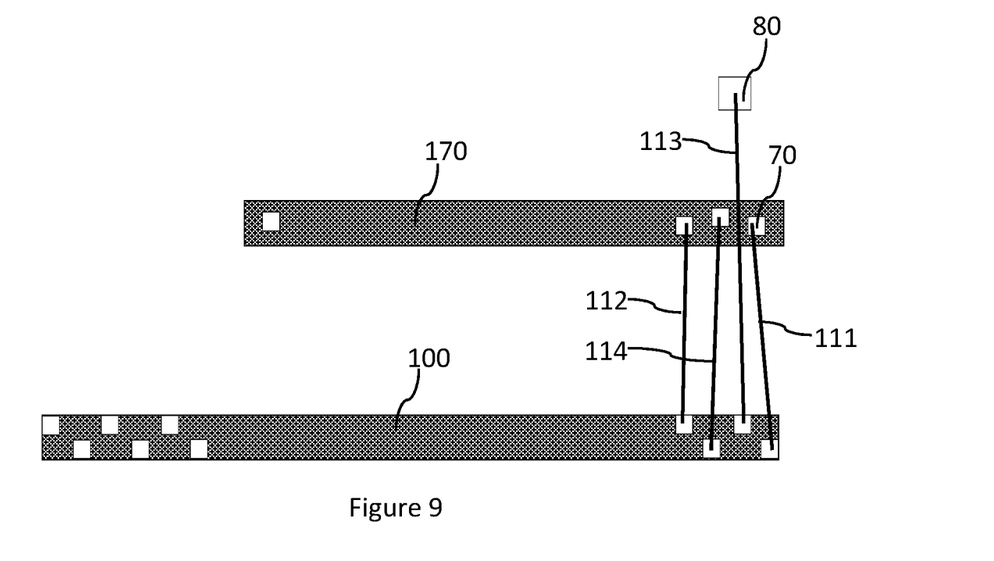
FIG. 9 illustrates a top view of an interface circuitry chip and a capacitive sensor chip and the interconnections thereof according to a second embodiment.

FIG. 9 illustrates a top view of the interface circuitry chip 100 and the capacitive sensor chip 170 and the interconnections thereof according to the second embodiment. Now the chip pads 70 are interconnected with bond wires. A floating bond pad 80 is provided that allows placement of the compensating interconnection bond wire 113. The term floating bond pad refers to a pad allowing mechanical action of bonding, but which does not provide an electrical connection. In addition to the sensor interconnection bond wire 111 and the common interconnection bond wire 112, additional bond wires may be disposed. In this example, there is a ground interconnection bond wire 114. The compensating interconnection bond wire 113 is disposed so that the capacitance between the compensating interconnection bond wire 113 and the common interconnection bond wire 112 is as close to the capacitance between the sensor interconnection bond wire 111 and the common interconnection bond wire 112 as possible.

Figure 10:
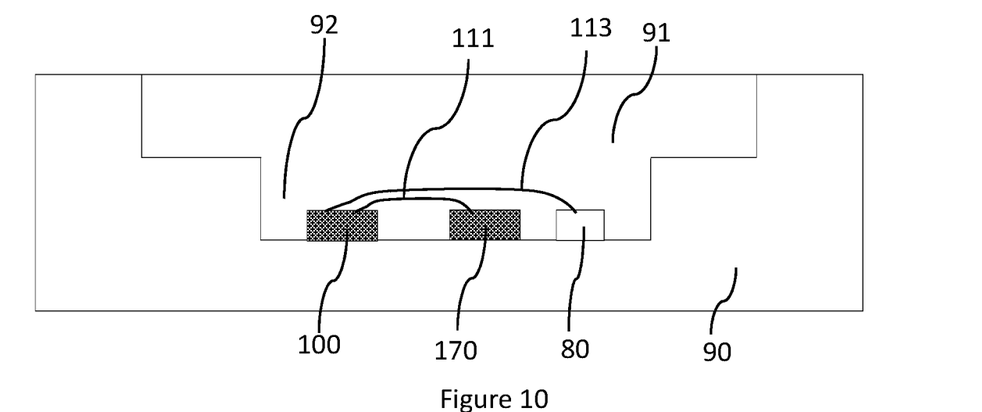
FIG. 10 illustrates a first phase of an experiment.
Figure 11:
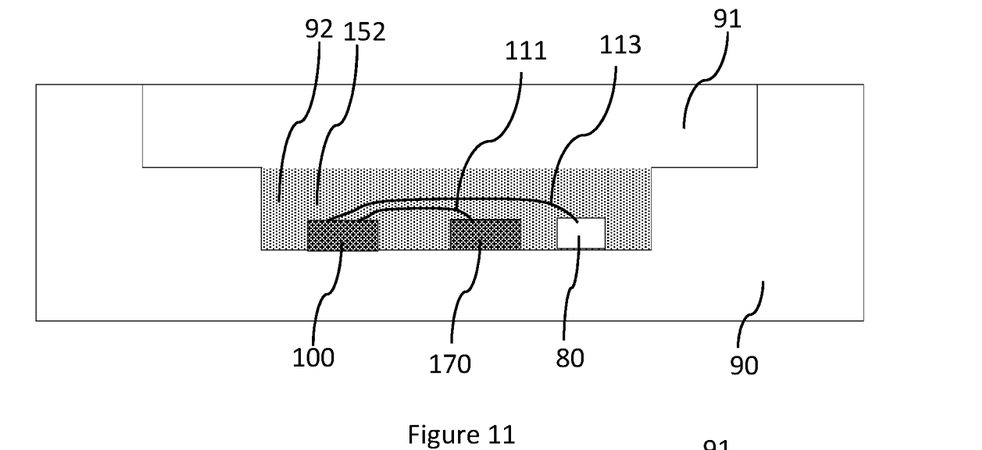
FIG. 11 illustrates a second phase of an experiment.
Figure 12:
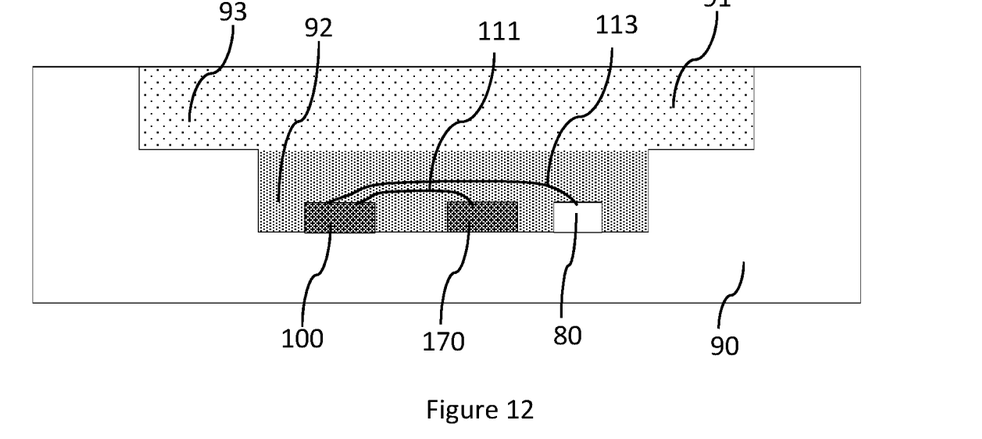
FIG. 12 illustrates a third phase of an experiment.

FIGS. 10, 11 and 12 illustrate a cross-section of the second embodiment, in which the circuitry is disposed in a ceramic housing 90. The ceramic housing has a lower cavity 92 into which the interface circuitry 100, the sensor 170, the interconnection bond wires 111, 112, 113, 114 and the floating bond pad 80 are disposed. This cross-section only shows the sensor interconnection bond wire 111 and the compensating interconnection bond wire 113. This embodiment also has an upper cavity 91, which is optional. The upper cavity 91 may be used for experimenting the effectiveness of the compensation method, but is not required for a commercial product. The lower cavity 92 or the combination of the lower cavity 92 and the upper cavity 91 represent the immediate environment of the circuitry disposed in the cavity and the interconnections thereof.

In the FIG. 10, the bare chips 100, 170 are disposed in the lower cavity 92 and bonded with bond wires 111, 113. The cavities are otherwise empty, typically filled with air having dielectric constant $\varepsilon_r=1$. The capacitances of the different interconnections are measured and the sensor 170 may be calibrated for accurate pressure readings.

The FIG. 11 illustrates a second phase of the experiment, in which the lower cavity 92 was filled with mold material 152. This mold material may be for example silicone gel with a dielectric constant different from that of the air. The capacitance changes due to gel molding are measured and the value of the weight coefficient k may now be calculated based on the capacitance measurements.

In the experiments performed, the calculated weight coefficient received a value k=0.835. As expected, the weight coefficient value was smaller than 1, since the compensating interconnecting bond wire 113 is longer than the sensor interconnecting bond wire 111 and is closer to the common interconnection bond wire and therefore the interconnection capacitance of the compensating interconnecting bond wire is greater than the sensor interconnection capacitance due to the sensor interconnecting bond wire.

The FIG. 12 illustrates a third phase of the experiment, in which the upper cavity 91 was filled with salt water solution 93. While the experiment was intended to mimic environment in which the catheter of the first embodiment would be utilized, a 1% solution of salt and water was used to mimic bodily fluids. After a while, the capacitances between the interconnections were measured again.

Figure 13:
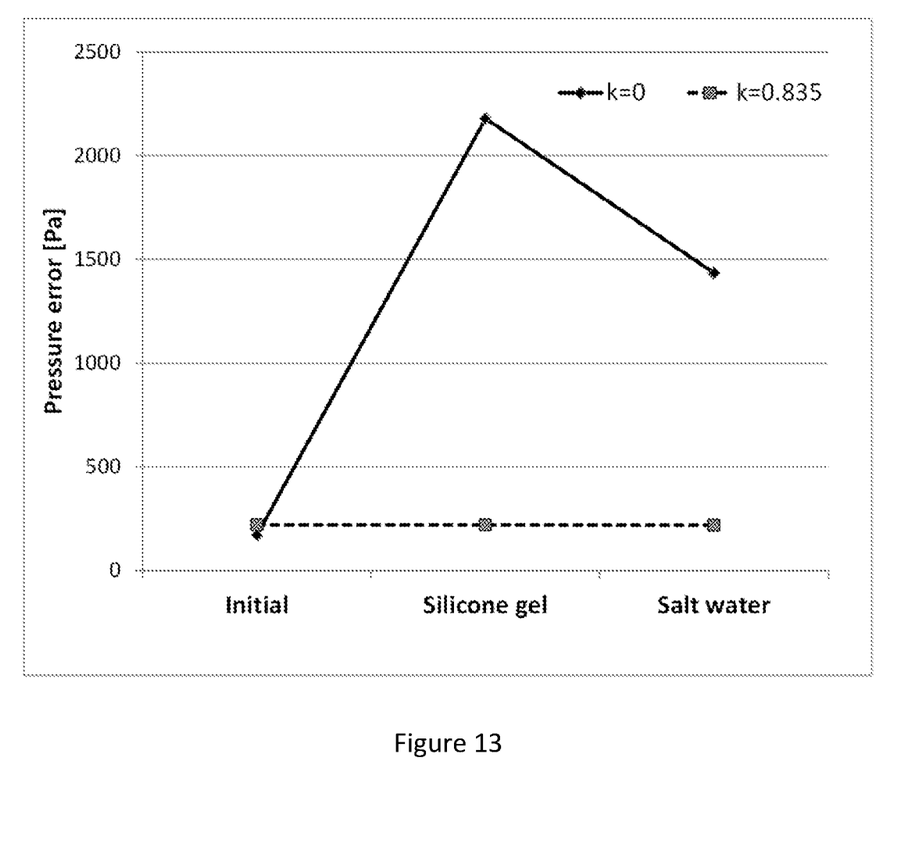
FIG. 13 illustrates results of an experiment.

FIG. 13 illustrates results of the experiment phases of the FIGS. 9, 10 and 11. Two sets of results of pressure error in the readings received from the sensor are shown. A first set of results, marked with diamonds interconnected with a solid line illustrate pressure error without compensation, in other words with a weight coefficient k=0. We may call this result set as the uncompensated result set. A second set of results, marked with squares interconnected with a dashed line, illustrates pressure error with compensating, using the obtained weight coefficient k=0.835. We may call this result set as the compensated result set.

The pressure error in the initial phase illustrated with the FIG. 10 has no significant difference between the uncompensated result and the compensated result. After applying the mold material 152, the uncompensated pressure error due to change in the interconnection capacitances would be 2200 Pa, and after exposing the molded circuitry to salt water, the uncompensated pressure error would be in the level of 1500 Pa, whereas the in the compensated readings the pressure error remains essentially the same independent on whether filling and salt water were disposed or not. The reason for decrease of the pressure error and thus the measured capacitance in the third phase with the salt water added was that the electrically conductive salt water on top of the mold material added shielding ground potential around the interconnections and thus decreased the interconnection capacitances. The initial pressure error and all the compensated pressure errors in FIG. 13 are all about +200 Pa. This error is the smallest that may be obtained around the atmospheric pressure with the chosen calibration function P, which was a hyperbolic function of first order with three independent calibration coefficients.

The experiment illustrated in the FIGS. 9 to 13 proofed effectiveness of the invented compensation method.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for cancelling effects of changes in interconnection capacitances on capacitive sensor readings provided by a capacitive sensor connected with an interface circuitry with at least two interconnections comprising a sensor interconnection and a compensating interconnection, the method comprising:
   obtaining a total sensor capacitance value from the capacitive sensor;
   obtaining a total compensating interconnection capacitance value from the compensating interconnection;
   calculating a compensated sensor capacitance value by reducing the obtained total compensating interconnection capacitance value multiplied with a weight coefficient from the obtained total sensor capacitance value; and
   providing an electrical signal at an output of the interface circuitry that corresponds to the compensated sensor capacitance value, wherein the compensated sensor capacitance value is independent of changes of relative permittivity in the immediate environment of the capacitive sensor, the interface circuitry and the interconnections thereof.

2. The method according to claim 1, further comprising: connecting the interface circuitry to the compensating interconnection disposed at the immediate vicinity of the sensor interconnection for obtaining the total compensating interconnection capacitance value, wherein the compensating interconnection is electrically connected only to the interface circuitry.

3. The method according to claim 2, further comprising:
obtaining, by the interface circuitry, the total sensor capacitance value when the sensor interconnection is coupled at its first input and a common interconnection is coupled at its second input; and
obtaining, by the interface circuitry, the total compensating interconnection capacitance value when the compensating interconnection is coupled at its first input and the common interconnection is coupled at its second input.

4. The method according to claim 3, further comprising:
multiplexing the first input of the interface circuitry to be connected to one of:
the sensor interconnection for obtaining the total sensor interconnection capacitance value; and
the compensating interconnection for obtaining the total compensating interconnection capacitance value;
wherein the multiplexing occurs at a frequency in a range between 10 milliseconds and 10 minutes.

5. The method according to claim 2, further comprising:
obtaining, by the interface circuitry, an integrating base capacitance value when only an integrating base capacitance is coupled at its first input and a common interconnection is coupled at its second input;
obtaining, by the interface circuitry, the total sensor capacitance value when the sensor interconnection is coupled at its first input and the common interconnection is coupled at its second input, wherein the total sensor capacitance value includes the integrating base capacitance value;
obtaining, by the interface circuitry, the total compensating interconnection capacitance value when the compensating interconnection is coupled at its first input and the common interconnection is coupled at its second input, wherein the total compensating interconnection capacitance value includes the integrating base capacitance value; and
subtracting the integrating base capacitance value from both the total sensor interconnection capacitance value and the total compensating interconnection capacitance value before calculating the compensated sensor capacitance.

6. The method according to claim 5, further comprising:
multiplexing the first input of the interface circuitry to be connected to one of:
sensor interconnection for obtaining the total sensor interconnection capacitance value,
the compensating interconnection for obtaining the total compensating interconnection capacitance value, and
the integrating base capacitance for obtaining the integrating base capacitance value,
wherein the multiplexing occurs at a frequency in a range between 10 milliseconds and 10 minutes.

7. The method according to claim 2, further comprising:
disposing the compensating interconnection so that a capacitance between the compensating interconnection and the common interconnection is essentially equal to a capacitance between the sensor interconnection and the common interconnection.

8. The method according to claim 2, wherein the method comprises obtaining the weight coefficient by steps of:
measuring a first total sensor capacitance value and a first total compensating interconnection capacitance value in a first measurement;
subjecting the capacitive sensor and its interconnections to a change of relative permittivity in their immediate environment;
measuring a second total sensor capacitance value and a second total compensating interconnection capacitance value in a second measurement after subjecting the capacitive sensor and its interconnections to the change of the relative permittivity in their immediate environment;
calculating a change of the measured total sensor capacitance based on the change between the first and the second total sensor capacitance values, and a change of the measured compensating interconnection capacitance based on the change between the first and the second total compensating interconnection capacitance values; and
calculating the weight coefficient by dividing the change of the measured total sensor capacitance by the change of the measured compensating interconnection capacitance.

9. The method according to claim 1, wherein the method comprises obtaining the weight coefficient by steps of:
defining a calibration function;
measuring a first total sensor capacitance value, a first total compensating capacitance value and a first reference pressure value;
calculating a first compensated sensor capacitance value based on the first total sensor capacitance value and the first total compensating capacitance value using a dummy weight coefficient;
calculating, using the calibration function, a first pressure value corresponding to the first compensated sensor capacitance value;
subjecting the capacitive sensor and its interconnections to a change of the relative permittivity in their immediate environment;
measuring a second total sensor capacitance value, a second total compensating capacitance value and a second reference pressure value after subjecting the capacitive sensor and its interconnections to the change of the relative permittivity in their immediate environment;
calculating a second compensated sensor capacitance value based on the second total sensor capacitance value and the second total compensating capacitance value;
calculating, using the calibration function, a second pressure value based on the second compensated sensor capacitance value; and
obtaining the weight coefficient by adjusting the weight coefficient used for calculating the first compensated sensor capacitance value, the second compensated sensor capacitance value, the first pressure value and the second pressure value so that a first pressure error calculated using the adjusted weight coefficient equals with a second pressure error calculated using the same adjusted weight coefficient, wherein the first pressure error equals the difference between the first pressure value calculated using the adjusted weight coefficient and the first reference pressure value and the second pressure error equals the difference between the second pressure value calculated using the adjusted weight coefficient and the second reference pressure value.

10. An apparatus configured to cancel effects of changes in interconnection capacitances on capacitive sensor readings, the apparatus comprising a capacitive sensor and an interface circuitry, wherein the capacitive sensor is connected to the interface circuitry with at least two interconnections comprising a sensor interconnection and a compensating interconnection, and wherein the apparatus is configured to:
- obtain a total sensor capacitance value from the capacitive sensor;
- obtain a total compensating interconnection capacitance value from the compensating interconnection;
- calculate a compensated sensor capacitance value by reducing the obtained total compensating interconnection capacitance value multiplied with a weight coefficient from the obtained total sensor capacitance value; and
- provide at its output an electrical signal corresponding to the compensated sensor capacitance value, wherein the compensated sensor capacitance value is independent of changes of relative permittivity of the immediate environment of the capacitive sensor, the interface circuitry and the interconnections thereof.

11. The apparatus according to claim 10, wherein the compensating interconnection is disposed at the immediate vicinity of the sensor interconnection, wherein the interface circuitry is configured to be connected to the compensating interconnection for obtaining the total compensating interconnection capacitance value, and wherein the compensating interconnection is electrically connected only to the interface circuitry.

12. The apparatus according to claim 11, wherein a common interconnection is coupled at a second input of the interface circuitry and the apparatus further comprises a switch configured to multiplex a first input of the interface circuitry to be connected to one of:
- the sensor interconnection for obtaining the total sensor interconnection capacitance value, and
- the compensating interconnection for obtaining the total compensating interconnection capacitance value,
- wherein the multiplexing occurs at a frequency in a range between 10 milliseconds and 10 minutes.

13. The apparatus according to claim 11, wherein a common interconnection is coupled at a second input of the interface circuitry and the apparatus further comprises a switch configured to multiplex a first input of the interface circuitry to be connected to one of:
- only an integrating base capacitance for obtaining an integrating base capacitance value;
- the sensor interconnection for obtaining the total sensor interconnection capacitance value that includes the integrating base capacitance value; and
- the compensating interconnection for obtaining the total compensating interconnection capacitance value that includes the integrating base capacitance value;

wherein the multiplexing occurs at a frequency in a range between 10 milliseconds and 10 minutes and wherein the apparatus is further configured to subtract the integrating base capacitance value from both the total sensor interconnection capacitance value and the total compensating interconnection capacitance value before calculating the compensated sensor capacitance.

14. The apparatus according to claim 11, wherein the compensating interconnection is disposed so that a capacitance between the compensating interconnection and the common interconnection is essentially equal to a capacitance between the sensor interconnection and the common interconnection.

15. The apparatus according to claim 11, wherein the apparatus is further configured to:
- measure a first total sensor capacitance value and a first total compensating interconnection capacitance value in a first measurement;
- measure a second total sensor capacitance value and a second total compensating interconnection capacitance value in a second measurement after the capacitive sensor and its interconnections have been subjected to a change of relative permittivity in their immediate environment;
- calculate a change of the measured total sensor capacitance based on the change between the first and the second total sensor capacitance values, and a change of the measured compensating interconnection capacitance based on the change between the first and the second total compensating interconnection capacitance values; and
- calculate the weight coefficient by dividing the change of the measured total sensor capacitance by the change of the measured compensating interconnection capacitance.

16. The apparatus according to claim 10, wherein the apparatus is further configured to:
- define a calibration function;
- measure a first total sensor capacitance value, a first total compensating capacitance value and a first reference pressure value;
- calculate a first compensated sensor capacitance value based on the first total sensor capacitance value and the first total compensating capacitance value using a dummy weight coefficient;
- calculate, using a calibration function, a first pressure value corresponding to the first compensated sensor capacitance value;
- measure a second total sensor capacitance value, a second total compensating capacitance value and a second reference pressure value after the capacitive sensor and its interconnections have been subjected to a change of relative permittivity in their immediate environment;
- calculate a second compensated sensor capacitance value based on the second total sensor capacitance value and the second total compensating capacitance value;
- calculate, using the calibration function, a second pressure value based on the second compensated sensor capacitance value; and
- obtain the weight coefficient by adjusting the weight coefficient used for calculating the first compensated sensor capacitance value, the second compensated sensor capacitance value, the first pressure value and the second pressure value so that a first pressure error calculated using the adjusted weight coefficient equals with a second pressure error calculated using the same adjusted weight coefficient, wherein the first pressure error equals the difference between the first pressure value calculated using the adjusted weight coefficient and the first reference pressure value and the second pressure error equals the difference between the second pressure value calculated using the adjusted weight coefficient and the second reference pressure value.

* * * * *